Feb. 25, 1958   A. C. TURNEY ET AL   2,824,723
FLUIDIZING COOLING CONVEYOR AND METHOD OF HEAT EXTRACTION
Filed July 16, 1951
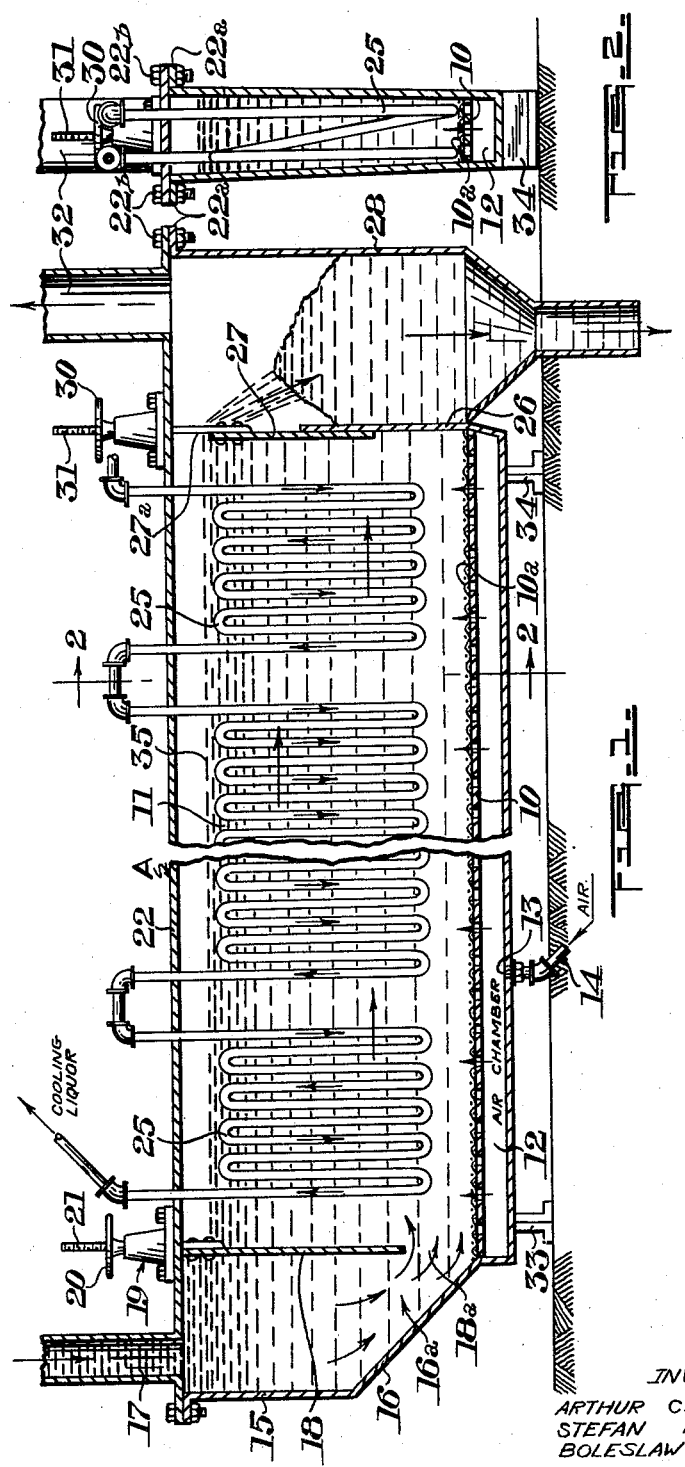
INVENTORS
ARTHUR C. TURNEY
STEFAN MITESCU
BOLESLAW J. ZUBRZYCKI
BY *Smart + Bigger*
ATTORNEYS United States Patent Office 2,824,723
Patented Feb. 25, 1958

2,824,723

FLUIDIZING COOLING CONVEYOR AND METHOD OF HEAT EXTRACTION

Arthur C. Turney, Stefan Mitescu, and Boleslaw Joseph Zubrzycki, Arvida, Quebec, Canada, assignors, by mesne assignments, to F. L. Smidth & Co., New York, N. Y.

Application July 16, 1951, Serial No. 237,032

Claims priority, application Canada July 20, 1950

14 Claims. (Cl. 257—240)

Our invention relates to a method and apparatus for effecting heat transfer between pulverulent materials and a fluid medium with a minimum of heat loss.

Our invention is particularly advantageous in the cooling of hot pulverulent materials such as calcined alumina and the like with the simultaneous recovery of heat.

Previously, cooling of this type of material was usually performed in rotary conveying coolers, which were subject to a number of disadvantages, the most important of these being that they provided a comparatively low cooling efficiency per foot of length, were costly to build and maintain, and provided no effective means for recovering the heat withdrawn from the finely divided solids on any economically practical basis.

It has been known for some time that it is possible to reduce the angle of repose of very finely divided solids to a point where the solids behave to a large extent like fluids, by passing a carefully regulated flow of air or other gaseous medium upwardly therethrough. While in this state the pulverulent materials are said to be "fluidized," and various industrial applications of this phenomenon have already been proposed. It has been found, for instance, that "fluidized" solids may be made to pass downwardly through a tower of suitable design against countercurrent flow of gases in much the same way as a liquid may be made to descend in a bubble tower against the countercurrent flow of gases. This type of apparatus has been proposed for various uses including direct heat exchange between the ascending gases and the descending "fluidized" solids. Due to the high head room required for this type of apparatus and the difficulty of recovering the heat absorbed by the rising gases in a practical manner as well as the problem presented by the entrainment of the pulverulent particles in the gas stream, this method of cooling is not well adapted to carry out the cooling of such materials as calcined alumina and the like. Up until the present no satisfactory method has presented itself for carrying out this operation which offers any reasonable possibility of recovering a practical quantity of the heat removed from the pulverulent materials.

Our invention provides a method and apparatus which effectively carries out the cooling of hot pulverulent materials while providing for the recovery of a very high percentage of the heat lost on cooling. Moreover, due to the simplicity of design and lack of moving parts in the apparatus of the invention the initial cost thereof is low and the maintenance cost is reduced to a minimum. Moreover, our invention provides such a method and apparatus which possesses a high cooling capacity per unit of space occupied and a high capacity in tons per hour of material handled without requiring any head room additional to that usually available in a normal industrial building.

According to our invention a horizontal bed of hot pulverulent material is maintained in a "fluidized" condition by passing a regulated uniformly disposed flow of gaseous medium upwardly therethrough and the thus fluidized material is caused to flow substantially horizontally past cooling coils situated in the bed, by continuously supplying hot pulverulent material to the bottom region of the bed at one end thereof and allowing a continuous overflow of fluidized cooled material from the other end of said bed. The fluidizing gaseous medium is separated from the pulverulent material as the latter overflows from the end of the bed and the cooled pulverulent material is then ready to be conveyed away for purposes of shipping or further operations.

The apparatus according to our invention is essentially simple in construction and consists essentially of an elongated, channel-shaped conveying trough the bottom whereof is formed of a diaphragm through which a fluidizing gaseous medium can be forced under pressure. An air box of conventional design is provided underneath the diaphragm and is equipped with suitable means for supplying a suitable gaseous medium at a controlled rate of delivery and pressure. One end of the trough is provided with means for continuously supplying thereto hot pulverulent material to be cooled, and means are provided for confining the flow of incoming material to the region adjacent the bottom of the trough. Preferably, the amount of influx of pulverulent material is adjustable. The other end of the trough is provided with an outlet gate, which is preferably adjustable as to height, over which the fluidized cooled pulverulent material is allowed to overflow into a suitable hopper. The hopper is suitably provided with an outlet for the fluidizing gases which separate from the cooled pulverulent material at this point. Suitable cooling coils provided with means for circulating cooling fluid therethrough are suspended lengthwise throughout substantially the entire length of the conveying trough. These may be arranged in any suitable manner provided that they do not obstruct the flow of fluidized solids.

One embodiment of our invention is illustrated in the accompanying drawings in which Figure 1 is a longitudinal vertical section of an apparatus according to the invention; and Figure 2 is a transverse vertical section of the same apparatus taken along the line 2—2 of Figure 1.

Referring now more particularly to the drawings in the embodiment illustrated, an apparatus according to the invention comprises an elongated trough indicated generally at A. The trough A is divided by the porous diaphragm 10 into a conveyor trough 11 and an air box 12. The diaphragm is made of suitable porous material such as canvas, wire gauze, or the like supported on a suitable grating 10a, which will permit passage of air therethrough but retain the pulverulent material. The air box 12 is supplied with compressed air from a suitable source (not shown) through the port 13 and air-line 14.

The end 15 of the conveyor trough 11 is provided with the sloping portion 16 to form the feed bin 16a, and means (not shown) are provided for the continuous supply of hot pulverulent material thereto through the supply conduit 17. The vertically reciprocable gate 18 permits passage of pulverulent material into the portion of the conveyor trough above the diaphragm 10 only through the open space therebelow which forms the feed gate 18a. The gate 18 is provided with a manual control 19 which consists essentially of the hand wheel 20 which is threaded to the vertically reciprocal screw 21 whereby turning of the handle member 20 will raise or lower the reciprocable gate 18 to any desired position of adjustment.

As those familiar with the flow characteristics of pulverulent solids will appreciate, the rate of flow of pulverulent material due to any given gravity head through a gate such as the feed gate 18a will depend largely upon the natural angle of repose of the material, as well as other physical characteristics thereof.

Thus, provision for vertical adjustment of the gate 18 although not essential to the principle of operation of the apparatus, is highly desirable to enable the feed to be adjusted to maintain the optimum conditions of operation despite variations in the physical characteristics of the feed.

The top of the conveyor trough 11 is closed off from the atmosphere by the cover plate 22 which is bolted to flanges 22a by bolts 22b.

The cooling coils 25 are positioned within the conveyor trough 12 and are connected in series to a suitable supply of cooling medium. The cooling coils may of course be connected in parallel or in series parallel without changing the essential nature of the device. Means (not shown) are also provided in the cooling system for effecting a continuous circulation of the cooling fluid through the coils counter-current to the flow of pulverulent material along the conveyor trough 11.

The cooling coils 25 may take any form which does not unduly obstruct the flow of fluidized solids. The use of unitized flat strings of tubular coils substantially as illustrated has, however, been found to be particularly satisfactory.

The end 26 of the conveyor trough 11 is provided with the vertically reciprocable member 27 which is formed to provide an outlet gate 27a, through which the fluidized pulverulent material may overflow into the hopper 28. The position of the vertically reciprocable member 28 is controlled in the same manner as the position of the gate 21 by the manually operable hand wheel 30 which is screw threaded to the vertically reciprocable screw member 31.

A stack 32 is provided above the hopper 28 to carry away the fluidizing gas after it is set free from the pulverulent material.

The trough A is suitably supported above the floor of the plant on the pedestals 33 and 34.

The apparatus described above operates as follows:

Hot pulverulent material such as calcined alumina or the like, is fed to the end 15 of the conveyor trough 11 and passes through the feed gate 18a onto the diaphragm 10. Air or other fluidizing gaseous medium is passing upwardly through the porous bottom in a controlled flow and, as the pulverulent material passes beneath the feed gate 18, the air passes upwardly through it thereby reducing its angle of repose to substantially zero. The pulverulent material as it becomes fluidized behaves substantially like a liquid and flows right across the diaphragm 10 whereupon it commences to fill up the conveyor trough 11. As soon as the level of the fluidized pulverulent material in the conveyor trough 11 reaches a certain height, it begins to overflow over the outlet gate 27a into the hopper 28 and the rate of overflow into the hopper will finally correspond to the rate of feed of fresh hot pulverulent material to the feed bin 16a. The level of the top of the fluidized material within the conveyor trough 11 will remain substantially constant, as indicated at 35. However, it will be noted that each individual particle of the pulverulent material will flow from the inlet port 18a to the outlet gate 27a and in the course of doing this, will pass around and about the coils 25 in which the cooling liquor is being circulated.

As the cooled fluidized material is deposited in the hopper 28, the fluidizing gas separates from it and passes away upwardly through the stack 32. The cooled pulverulent material is withdrawn as desired from the bottom of hopper 28.

It will be appreciated that whereas we have shown the cooling means to be connected in series, with the outlet end at the hot side of the conveyor trough 11, any method of arranging the cooling means within the trough which recommends itself for any particular purpose is equally satisfactory according to the invention, and the apparatus described may, moreover, instead of being used for cooling pulverulent material, be used for adding heat to it.

We have found, that for proper operation of the apparatus the space velocity of the air used for fluidizing should be sufficient to bring about a complete fluidization of the solids, but should be kept substantially below the range of velocity in which part or all of the solids become entrained by the gas, forming a "disperse fluido-solids system."

The heat transfer efficiency and heat recovery in the cooling liquor is remarkable, as illustrated by the following example, which represents a heat balance obtained from an apparatus constructed on a pilot plant scale.

*Example 1*

An apparatus similar in construction to that illustrated in Figures 1 and 2 was constructed on a pilot plant scale, the dimensions thereof being 12 feet in length and 18 inches in width, with a conveying trough 10 feet long, 18 inches wide and 42 inches high, equipped with adjustable gate and heat exchange elements in the form of two strings of water cooled coils. The average amount of air used for fluidizing was 31.4 cubic feet per minute per square foot. The flow of cooling liquid through the coils was 0.64 cubic feet per minute and the flow of alumina through the apparatus was 15,000 pounds per hour. The temperature of the alumina at the inlet was 361.5° F. which fell to 269.3° F. at the outlet. The temperature of the cooling water at the inlet was 77.0° F. and rose to 192.3° F. at the outlet. The total heat balance of the run was as follows.

|  | B. t. u./min. | Percent |
| --- | --- | --- |
| (a) Total heat introduced by the alumina | 5,060 | 100.00 |
| (b) Heat absorbed by the fluidizing air | 397 | 7.84 |
| (c) Heat recovered by the cooling fluid | 4,593 | 90.76 |
| (d) Heat loss through radiation | 70 | 1.40 |

The temperature in a vertical cross-section of the bed was found to be the same from the bottom to the top thereof.

The drop in temperature along the trough was found to be a logarithmic function of the distance from the feed end when the cooling surface was continuous throughout the trough, and a variation of a linear and logarithmic function in the case of a non-continuous cooling surface.

What we claim as our invention is:

1. A method of extracting heat from hot pulverulent materials by effecting heat exchange between said materials and a cooling medium circulated through heat exchange elements progressively arranged in contact with said pulverulent material comprising; forming an elongated substantially horizontal bed of said pulverulent materials around and about said heat exchange elements; passing a carefully controlled uniformly dispersed sufficient flow of gaseous medium upwardly through said bed to maintain the pulverulent material in fluidized condition; continuously feeding pulverulent material to one end of said bed adjacent the bottom thereof and withdrawing fluidized pulverulent material from the top of the other end of said bed and conducting away the gaseous medium as it separates from the material thus withdrawn whereby the particles of said pulverulent materials are caused to flow substantially horizontally lengthwise of said bed while in fluidized condition and pass around and about said heat exchange elements to effect heat exchange therewith; and flowing a cooling medium through said heat exchange elements in counter-current relationship to the direction of flow of said pulverulent materials whereby the temperature of the material within said bed progressively decreases during its passage through the bed.

2. A method as defined in claim 1 in which the pulverulent material is fed to the bed by gravity.

3. Apparatus for effecting heat exchange between pulverulent materials and a fluid medium circulated through heat exchange elements comprising a substantially horizontal elongated channel-shaped trough, a substantially horizontal porous diaphragm longitudinally dividing said trough into a conveyor trough thereabove and an air-box therebelow, means for controllably supplying gaseous medium to said air-box, heat exchange elements arranged within the conveyor trough along the length thereof in a manner which provides for free passage of pulverulent material therearound, means for continuously feeding pulverulent material to one end of said conveyor trough adjacent the bottom thereof, and means for continuously withdrawing pulverulent material from the other end of the conveyor trough adjacent the top thereof.

4. Apparatus as defined in claim 3 in which the top of the conveyor trough is provided with cover means closing it off from the atmosphere.

5. Apparatus as defined in claim 3 in which hopper means are provided adjacent the end of the conveyor trough from which fluidized pulverulent material is withdrawn to collect said pulverulent material, said hopper means being provided with means for conducting away gaseous medium as the latter separates from the pulverulent material in said hopper means.

6. Apparatus as defined in claim 3, in which the means for feeding pulverulent material to one end of the conveyor trough adjacent the bottom thereof comprises feed bin means, means for continuous supply of pulverulent material to said feed bin means by gravity, a feed gate between said feed bin and the lower portion of the end of the conveyor trough and vertically reciprocable gate means arranged to open and close said feed gate to control the rate of feed of pulverulent material to said conveyor trough.

7. Apparatus as defined in claim 4, in which the means for feeding pulverulent material to one end of the conveyor trough adjacent the bottom thereof comprises feed bin means, means for continuous supply of pulverulent material to said feed bin means by gravity, a feed gate between said feed bin and the lower portion of the end of the conveyor trough and vertically reciprocable gate means arranged to open and close said feed gate to control the rate of feed of pulverulent material to said conveyor trough.

8. Apparatus as defined in claim 5, in which the means for feeding pulverulent material to one end of the conveyor trough adjacent the bottom thereof comprises feed bin means, means for continuous supply of pulverulent material to said feed bin means by gravity, a feed gate between said feed bin and the lower portion of the end of the conveyor trough and vertically reciprocable gate means arranged to open and close said feed gate to control the rate of feed of pulverulent material to said conveyor trough.

9. Apparatus as defined in claim 3, in which said means for continuously withdrawing fluidized pulverulent material from the top of said other end of the conveyor trough comprises vertically adjustable outlet gate means arranged to permit overflow of fluidized pulverulent material therethrough from the top of a bed thereof maintained within said conveyor trough, the depth of said bed being controlled by the height of said outlet gate.

10. Apparatus as defined in claim 4, in which said means for continuously withdrawing fluidized pulverulent material from the top of said other end of the conveyor trough comprises vertically adjustable outlet gate means arranged to permit overflow of fluidized pulverulent material therethrough from the top of a bed thereof maintained within said conveyor trough, the depth of said bed being controlled by the height of said outlet gate.

11. Apparatus as defined in claim 5, in which said means for continuously withdrawing fluidized pulverulent material from the top of said other end of the conveyor trough comprises vertically adjustable outlet gate means arranged to permit overflow of fluidized pulverulent material therethrough from the top of a bed thereof maintained within said conveyor trough, the depth of said bed being controlled by the height of said outlet gate.

12. Apparatus as defined in claim 4, in which said heat exchange elements are unitized flat strings of tubular coils.

13. Apparatus as defined in claim 5, in which said heat exchange elements are unitized flat strings of tubular coils.

14. Apparatus as defined in claim 6, in which said heat exchange elements are unitized flat strings of tubular coils.

References Cited in the file of this patent

UNITED STATES PATENTS

| 1,326,174 | Borcherdt | Dec. 30, 1919 |
|---|---|---|
| 1,370,531 | Fowler | Mar. 8, 1921 |
| 1,753,276 | Quinn et al. | Apr. 8, 1930 |
| 1,964,256 | Fahrenwald | June 26, 1934 |
| 2,219,490 | Pisarev | Oct. 29, 1940 |

FOREIGN PATENTS

| 229,258 | Great Britain | Aug. 6, 1925 |
|---|---|---|
| 587,774 | Great Britain | May 6, 1947 |